United States Patent

Kerdranvrat

[11] Patent Number: 5,193,001
[45] Date of Patent: Mar. 9, 1993

[54] METHOD OF SEGMENTING THE FIELD OF MOTION OF AN IMAGE AND ITS APPLICATION TO THE ENCODING OF VIDEO IMAGES

[75] Inventor: Michel Kerdranvrat, Rennes, France

[73] Assignee: Thomson Consumer Electronics, Courbevoie, France

[21] Appl. No.: 655,438

[22] PCT Filed: Jun. 22, 1990

[86] PCT No.: PCT/FR90/00461
  § 371 Date: Feb. 26, 1991
  § 102(e) Date: Feb. 26, 1991

[87] PCT Pub. No.: WO91/00577
  PCT Pub. Date: Jan. 10, 1991

[30] Foreign Application Priority Data
  Jun. 27, 1989 [FR] France ............................ 8908547

[51] Int. Cl.$^5$ ............................................. H04N 7/18
[52] U.S. Cl. ............................... 358/105; 358/136
[58] Field of Search ....................... 358/105, 136, 140

[56] References Cited

U.S. PATENT DOCUMENTS 4,661,849 4/1987 Hinman .
4,901,149 2/1990 Fernando et al. ............. 358/105 X
4,965,666 10/1990 Haghiri ............................ 358/105
5,027,203 6/1991 Samad et al. ..................... 358/140

FOREIGN PATENT DOCUMENTS 2551290 3/1985 France .
2628864 9/1989 France .

Primary Examiner—Victor R. Kostak
Attorney, Agent, or Firm—Oblon, Spivak, McClelland, Maier & Neustadt

[57] ABSTRACT

A method of segmenting the field of motion of an image, particularly a video image, including forming a blockwise field of motion from motion vectors allocated to image pixels, processing the blockwise field of vectors in order to extract from this field a set of dominant vectors of motion, by elimination of the vectors close to the dominant vectors, so as to retain only representatives of widened classes of motion. Then a vector of the reduced set of dominant vectors is reassigned to each block, and the resulting field, after time filtering, is used for the encoding of the image by "quad-tree" encoding. This disclosed method applies in particular, to the setting-up of the coding-auxiliary digital data to the limit of 1 Mbt/s.

12 Claims, 6 Drawing Sheets

|   | $V_X$ | $V_Y$ |
|---|---|---|
| 1 | | |
| K | SORT(K,1) | SORT(K,2) |
| I | SORT(I,1) | SORT(I,2) |
| J | SORT(J,1) | SORT(J,2) |
| N | | |

SORT={DOMINATE VECTOR}

*FIG. 8a* MEM 1 (SORT TABLE TRANSFERRED)

*FIG. 8b* MEM 2 (PRECEDING IMAGE)

COMPARAISON ized by a transmission channel allowing the addition

METHOD OF SEGMENTING THE FIELD OF MOTION OF AN IMAGE AND ITS APPLICATION TO THE ENCODING OF VIDEO IMAGES

BACKGROUND OF THE INVENTION

The invention relates to the domain of the encoding/decoding of video images, in particular with the aim of transmitting high-definition images via a transmission channel which allows the addition of decoding-auxiliary digital data with a throughput equal to 1 Mbit/s. The subject of the invention is in particular a method of segmenting a pointwise field of motion of images with a view to encoding it to the limit of 1 Mbit/s, and its application to the encoding of video images.

DISCUSSION OF FIELD OF THE INVENTION

The most powerful currently known methods for transmitting digital video images implement methods of processing prior to transmission which enable reduction of the line flow rate transmitted. Thus for example, instead of transmitting all the information (chrominance, brightness) relating to all the pixels, the processing makes it possible to seek the differences between images and in particular the displacements of elements of images or of pixels and to transmit only the information for updating the image, namely the vectors characterising the displacement of the zones or of the pixels from one image to the next. A powerful method of processing consists in establishing one vector of motion per point and in transmitting this field of motion.

The flow rate of 1 Mbit/s is too low to enable the transmission of a pointwise field of motion for the video images in full; consequently, it is important to carefully choose the information, relating to the field of motion, which will be transmitted so as to obtain the best possible restoration of the images, the encoding of the transmitted information being established from the preceding image and from the field of motion associated with the current image.

A first arrangement adopted for the processing of the field of motion arising from a pointwise estimator of motion is to transmit only one motion vector per block of n×n pixels (n always being a power of 2). On the basis of a high-definition grid of 1440 points per line and 1152 lines, the resulting flow rate is 1.3 Mblocks for blocks of 8.8.

In order to optimise the encoding whilst still keeping to a flow rate lower than the prescribed flow rate (1 Mbit/s), the encoding method referred to as "quad-tree" has proven to be very interesting. This method in fact makes it possible to employ blocks of different sizes and therefore to reduce the block flow rate. To this end, the problem is to return the most uniform possible pointwise field of motion in sets of blocks.

It would then be possible to envisage constructing the histogram of the pointwise field of motion in its entirety. From the outset this procedure is global, this giving a large volume of data to be processed. Moreover, in order to next assign a vector to each of the n×n blocks, each vector acknowledged as dominant from the histogram must be compared with all the motion vectors of an n×n block so as to choose the best vector for the block. This method of segmenting is therefore weighty and possibly lengthy.

SUMMARY OF THE INVENTION

The subject of the invention is a method of segmenting the field of motion obtained by an estimator of motion enabling extraction, in a manner optimal for a subsequent processing by "quad-tree" encoding, of the "dominant" vectors which will be transmitted after encoding.

To this end, the segmenting method according to the invention consists firstly in carrying out a local processing on the field of motion in order to assign to each n×n block the "best" vector of motion from the set of vectors of motion which are available for the block; it is only then that a global processing enables extraction of a set of dominant vectors from the n×n blockwise field of vectors, which already comprises a reduced number of vectors and which can be considered as the best block field of motion which may be obtained from a pointwise field of motion.

The phase of reassigning an n×n block vector after extraction of the dominant vectors is thus facilitated.

Moreover, it would even be possible to directly consider an n×n block field of motion in order to implement the segmenting method in accordance with the invention.

The subject of the invention is also the application of this segmenting method to the "quad-tree" encoding of video images.

According to the invention, a method of segmenting the field of motion arising from an estimator of motion delivering, in the form of vectors with two components in the image plane, the displacement of pixels of an image relative to the preceding image, is characterised in that it comprises:

- a preliminary step of partitioning the image into blocks of n×n pixels and of assigning of a vector of motion chosen for each block from the possible vectors according to a majority criterion;

- a step of setting-up of a histogram of the blockwise motion vectors at the termination of which a classing of the motion vectors encountered is carried out according to their number of occurrences;

- a step of reassigning of a motion vector for each of the blocks, this vector being chosen from a limited number N of dominant vectors selected from the histogram, and being the vector, from these dominant vectors, closest to the initial vector of the block;

- a step of determining the isolated blocks having motion vectors incoherent with those of the blocks of their neighbourhood filtering the vectors of the isolated blocks;

- a step of calculating the flow rate necessary for the encoding of the resulting, filtered field of motion, and of verifying that this flow rate is less than or equal to a maximum possible flow rate, the step of reassigning of a motion vector for each of the blocks from a lower number of dominant vectors being taken up again when the flow rate is greater than the maximum possible flow rate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7A and 7B illustrate the table of dominant vectors, after deletion of the secondary maxima;

FIGS. 8A and 8B illustrate the time-filtering step taking into account the dominant vectors in corresponding portions of successive images;

DESCRIPTION OF THE PREFERRED EMBODIMENTS

As indicated above, the segmenting method applies particularly to the field of the pointwise motion delivered by an estimator of motion. It is recalled that a pointwise estimator of motion furnishes, for each point of a video image undergoing analysis, a motion vector V characterising the displacement of the corresponding pixel between the preceding image and the current image. This vector therefore has components $V_x$ and $V_y$ in co-ordinate axes x,y of the image plane.

Figure 1:
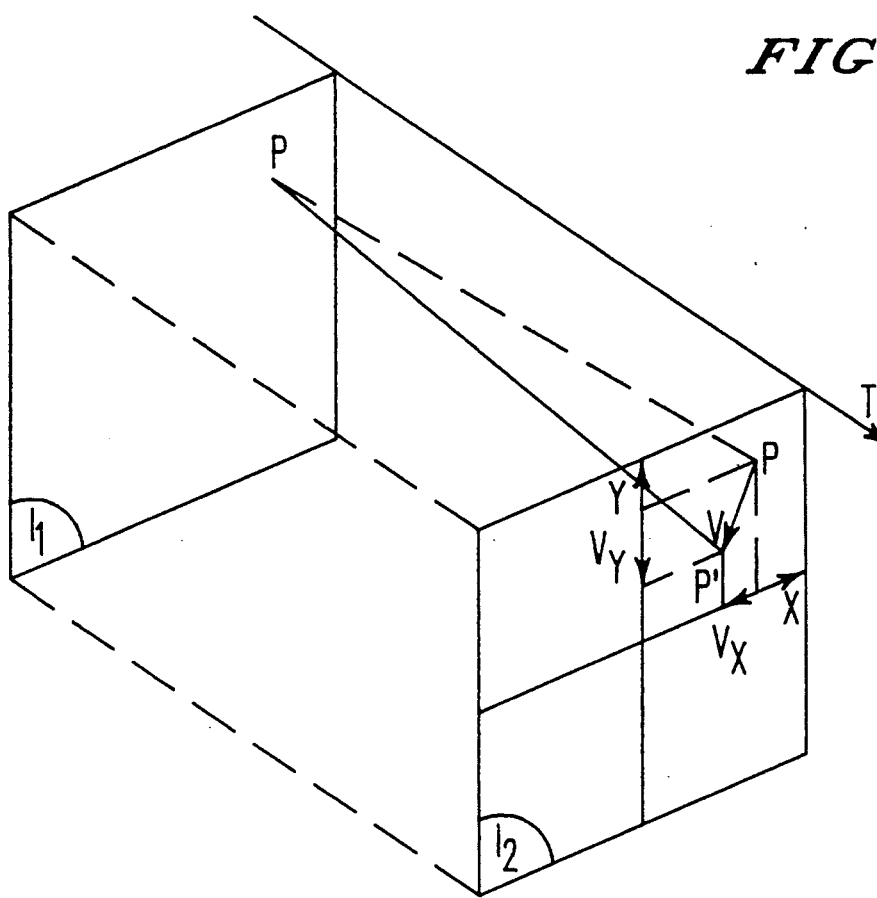
FIG. 1 illustrates the motion vector of a pixel between two successive images.

FIG. 1 illustrates the motion vector, and its components in the image plane, for a point P of an image $I_1$ having become P' in the posterior image $I_2$.

The segmenting method, according to the invention, from a pointwise field of motion proceeds in the manner described below.

Figure 2:
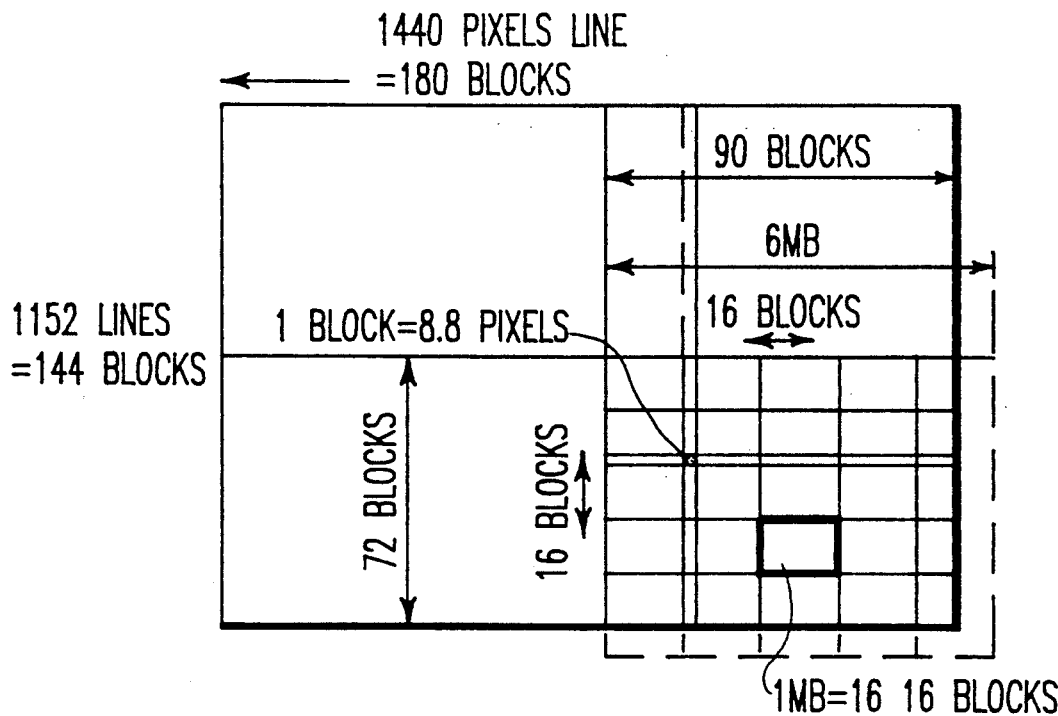
FIG. 2 represents a high-definition image and its partitioning for the implementation of the segmenting method according to the invention.
Figure 3A:
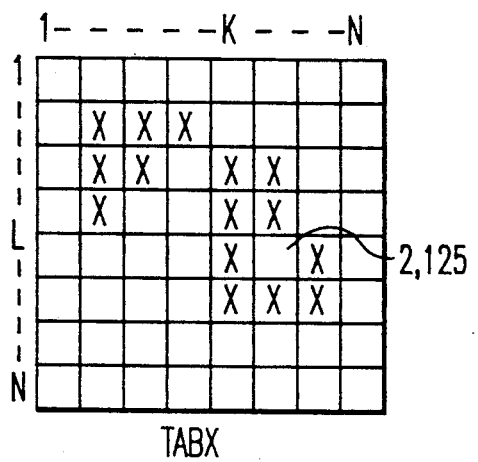
FIGS. 3A–3C illustrate the formation of the tables of components of the motion vectors for an elementary block and the histogram table which results therefrom for the allocation of a block vector.
Figure 3B:
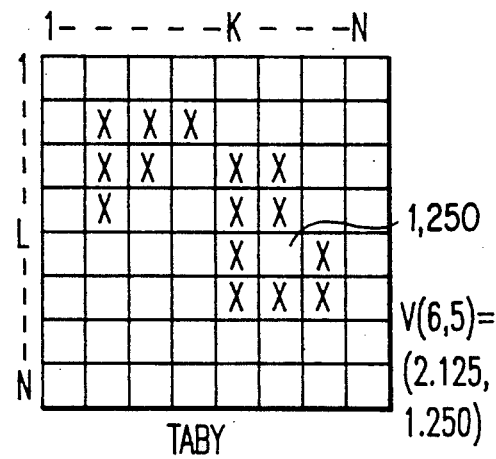
Figure 3C:
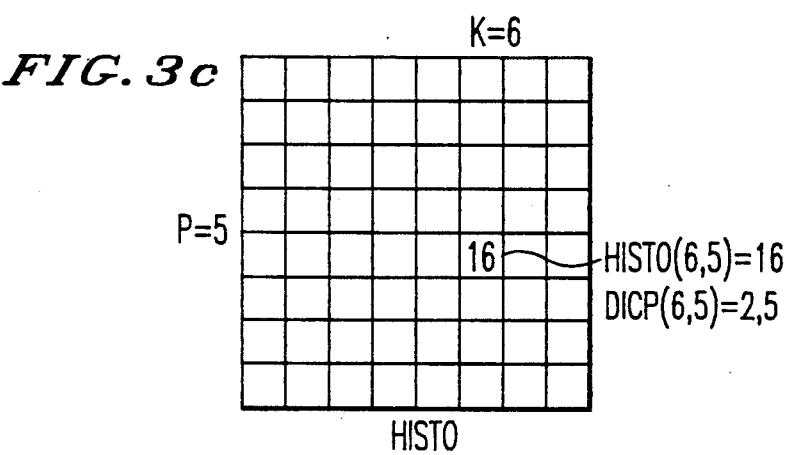

The first step consists in assigning one motion vector per block of n×n pixels. FIG. 2 illustrates a high-definition image with 1440 columns and 1152 lines, for which there is available a field of motion constituted by one vector per point, or possibly by one vector for one point in two of a line (the vectors calculated for the next line then corresponding to points staggered in formation with those of the preceding line), in accordance with the motion estimating method implemented by the estimator. This first step consists in attributing one of the, 64 (or 32) vectors of the block to the block of n×n (8×8) points, this vector being chosen as vector of the block in accordance with a majority criterion. To this end, the components $V_x$ and $V_y$ of the motion vectors of each of blocks are ranked in tables with the dimension of the block, TABX for the X components and TABY for the Y components, such as represented in FIG. 3. Thus, in the table TABX for example, the value TABX(k,l) in the location corresponding to the kth column and the lth line is the component $V_x$ of the pixel of rank k in line 1 of the block. For a vector of the block V(k,l) the following operations are carried out in order to determine the deviations between the components of this vector and the components of the other vectors of the block V(i,j), i and j describing the set [1,n]:

$$FX = |TABX(k,l) - TABX(i,j)| \quad (1)$$

$$FY = |TABY(k,l) - TABY(i,j)| \quad (2)$$

These two tests correspond to a comparison of the vector V(k,l) with all the vectors of the block, to within the precision.

If FX and FY are less than or equal to a threshold S1, where S1 is equal to the precision of the vectors ($\frac{1}{8}$=0.125 pixels), then the number of occurrences of the vector V(k,l) is increased by 1. The number of occurrences of V(k,l) is denoted HISTO(k,l) and each time that the test if satisfied, HISTO(k,l) is updated:

$$HISTO(k,l) = HISTO(k,l) + 1 \quad (3)$$

The dispersion of the vector similar to V(k,l) is likewise updated:

$$DISP(k,l) = DISP(k,l) + FX + FY \quad (4)$$

The choice of a vector for the block is made at the termination of these comparisons by taking the vector which has the highest number of occurrences and, in the event of equality of occurrences, the one which has the lowest dispersion, from the table HISTO constructed from tables TABX and TABY of the block. In the tables TABX and TABY the components $V_x=2.125$ and $V_y=1.250$ of the vector V(6,5) have been written in by way of example, that is to say the motion vector of the 6th point of the 5th line of the current block of 8×8 undergoing analysis.

Likewise by way of example, the locations of the tables TABX and TABY containing the components of vectors considered as similar, (the differences FX and FY being less than $S_1=0.125$) have been indicated with a cross. In the resulting table HISTO, HISTO(5,6) which is the number of occurrences of this vector is indicated equal to 16. The corresponding dispersion is indicated DISP(6,5)=2.5.

The second step of the method of segmenting the field of motion according to the invention consists in filtering the field of motion resulting from the allocating of a block vector. This field is filtered by considering a 3×3 window around the current processed vector comprising the vectors of the neighbouring blocks: the central vector in this window is compared with its eight neighbours and if this vector is distant from all its neighbours it is replaced by one of them:

A vector $V(V_x,V_y)$ is considered as distant from a vector $V'(V'_x, V'_y)$ if FX and FY, absolute value differences of the components of V and V' along X and Y, are greater than a predetermined threshold $S_2 \cdot S_2$ can be equal to 0.5 for example. When a vector is thus distant from all its neighbours, it is "filtered", that is to say replaced by that one of the eight neighbouring blocks which appears with the highest number of occurrences among the pointwise vectors of the block to be filtered in the corresponding table HISTO(k,l), then in the event of equality, by that one which has the lowest dispersion, the number of occurrences and the dispersion having been calculated for each of the vectors of the block to be filtered as indicated in the preceding phase.

Figure 4:
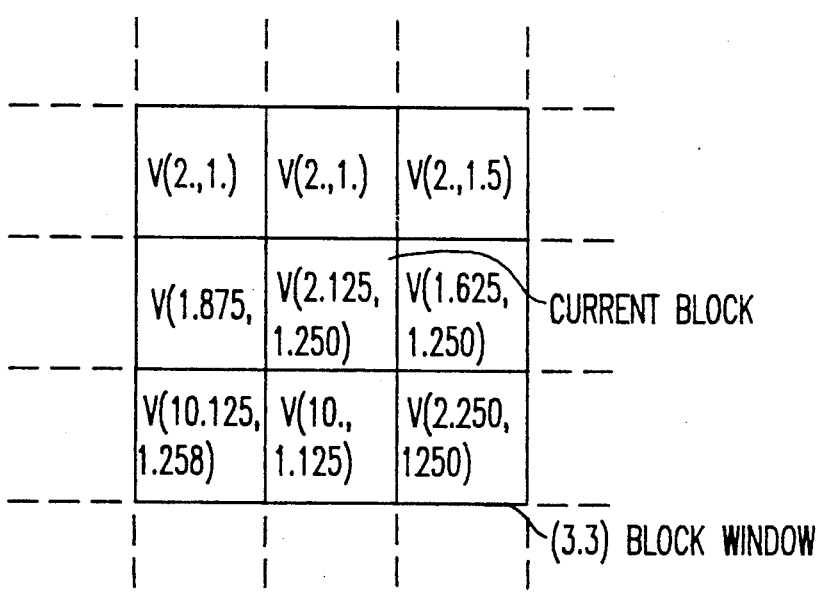
FIG. 4 illustrates the filtering step, after the allocation of a block vector.

FIG. 4 illustrates this filtering step. The vector accepted for the block, the tables of which have been illustrated in FIG. 3, being assumed to be the vector V(6,5)=(2.125,1.1250), this block being assumed to be the one undergoing processing as regards the filtering phase, this central block is represented surrounded by its 8 neighbours thus forming the filtering window of (3×3) blocks. In the example represented, this vector is retained since it is not distant from all its neighbours (it is close in particular to the blocks of the preceding line and to its neighbours on the same line).

The next step consists in forming the histogram of the field of motion.

The pointwise field of motion of a high-definition image having been transformed into a field of motion constituted by a block vector of n.n points, has a size of 1440/n columns and 1152/n lines, i.e. 180.144 for 8×8 blocks.

One histogram is effected per high-definition image quarter, i.e. for each table of motion vectors of size (1440/2n, 1152/2n), i.e. 90.72 blocks in the example defined above: the vectors of the field of motion having components included between the numerical values −16 and +16, with a precision of $\frac{1}{8}$=0.125 pixels, for the purpose of simplification one multiplication by 8 of each component is carried out, this giving 255.255 possible vectors having integer components:

- $V_x$ belongs to the set [−15.875,+15.875], hence $8V_x$ belongs to the set [−127,+127]
- $V_y$ belongs to the set [−15.875,+15.875], hence $8V_y$ belongs to the set [−127,+127].

Figures 5, 6:
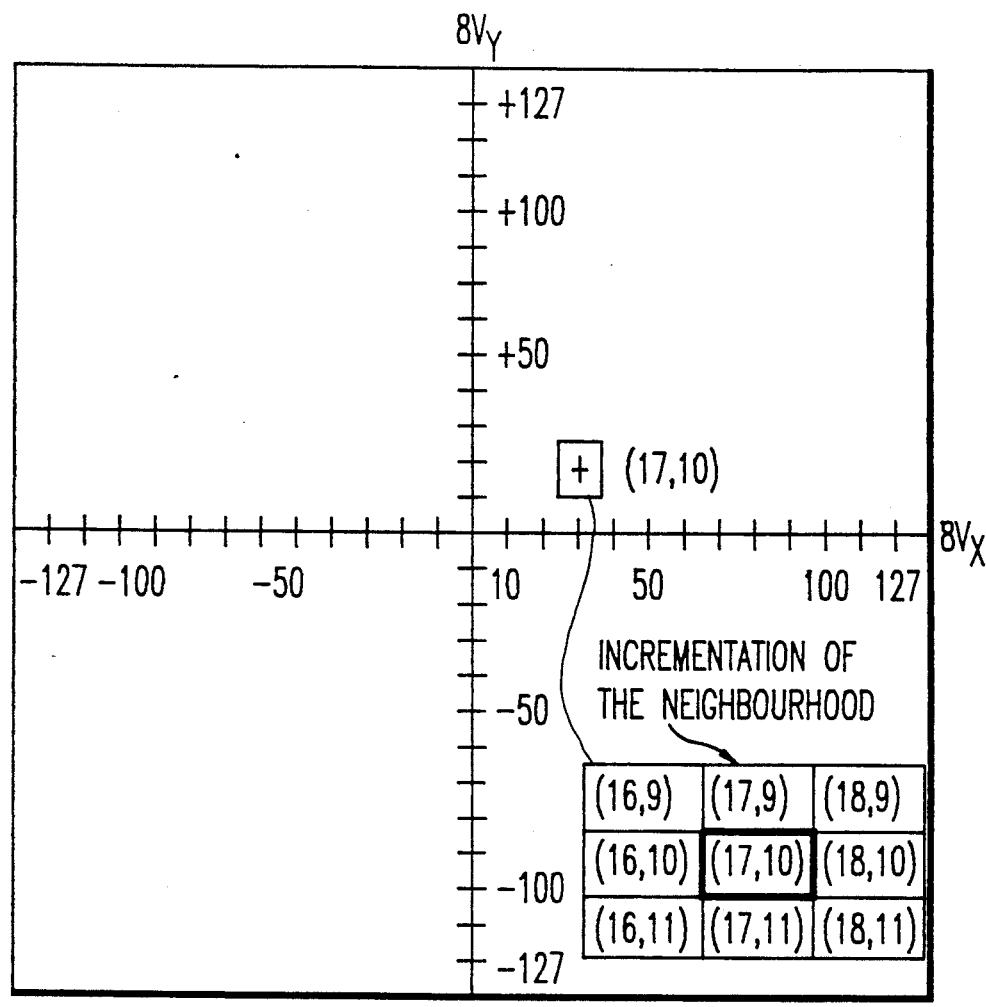
FIG. 5 illustrates the formation of the histogram of the vectors of the block field of motion, filtered for an image quarter.
FIG. 6 illustrates the step of extracting vectors by class of motion.

To construct the histogram of the filtered blockwise field of motion, a two-dimensional table is used which comprises all the possible displacements $8V_x$ and $8V_y$. The central location of this table corresponds to the zero displacement vector. The table of the motion vectors of the image quarter is analysed and, for each displacement vector of the blocks of the image quarter under consideration, the corresponding location of the histogram table is incremented as well as, in a preferred embodiment, the 8 neighbouring locations so as to effect in this step a spreading of the histogram. FIG. 5 illustrates the histogram table for an image quarter and gives the detail of the updating when the current block represented in FIG. 4, with vector V(2.125,1.250) i.e. 8V(17,10), is encountered, and leads to the incrementation of the locations in the neighbourhood such as illustrated. In the detail of the figure, the locations are denoted by their coordinates. Their content (not indicated) depends on the successive incrementations. After the construction of this histogram, for an image quarter (90.72 blocks), all the vectors whose number of occurrences is greater than a threshold $S_3$, $S_3$ able to be set at 4, are transferred into a new table such as represented in FIG. 6, with their occurrences: each line of the table therefore comprises three zones: the number of occurrences of the vector, its x component $V_x$ (or $8V_x$), and its y component $V_y$ (or $8V_y$). A classing by decreasing values of occurrences is then carried out in this table.

The next step is the extraction of a vector representing each "class" of motion, from the table obtained at the end of the preceding phase which contains the x components of the displacement vectors, the y components of the displacement vectors, and the numbers of occurrences. To this end, a comparison is carried out between the vector which has the highest number of occurrences, first in the classing carried out, that is to say in line 1 in the table, and all the other vectors of the table, with indices greater than 1. Those which are considered as close, to within a threshold $S_2$, $S_2$ being the same threshold as during the evaluation of proximity in the context of the filtering (i.e. $S_2$=0.5 for example) are eliminated, and the content of the table is shifted so as to fill in the gaps.

Next, the vector ranked in position 2 in the table is examined, subsequent to the classifying, in relation to the vectors ranked from the third position upwards and so on for all the vectors of the table. In FIG. 6 the close vectors have been joined by arrows; at the end of this step, the vectors situated at the starting points of the arrows have disappeared from the table. At the termination of this step each vector remaining in the table is the representative of a widened class of motion vectors.

The next step is the elimination of the secondary maxima. Around a vector having a high number of occurrences, can be found a few vectors which are close but whose proximity, evaluated by the differences of components, is greater than the threshold $S_2$, and having a lower number of occurrences. This phenomenon corresponds to the spreading of the histogram about the dominant vectors. These vectors may usefully be grouped with the vector to which they are close even though the difference is greater than 0.5 since it is useless to retain such vectors which create secondary maxima on the histogram of the class-reduced field of motion, obtained in the preceding step.

However, during this operation it is necessary to include the global motions on the image, of the zoom or rotation type, which have the effect of creating a virtually flat histogram since each point of the image has a displacement very close to that of its neighbours, but all the image points have however different displacements. Consequently, when the secondary maxima of the histogram are sought, the first vector examined is that from the first line of the table, that is to say the one which has the largest number of occurrences, and the presence of secondary maxima in this vector is not considered until at least two vectors with index greater than 1 in the table are close to it, to within the threshold $S_5$.

Let SORT(N,3) be the one-dimensional table with three zones resulting from the sorting into classes, N being the number of vectors which remain at this step of the algorithm. If k is the index of the line of the vector to be examined in the table SORT, k varies from 1 to N. If at least two vectors on lines with indices greater than k, i and j, are close to the vector in line k, with consequently a lower number of occurrences than the number of occurrences of the vector in line k, these vectors are then considered as secondary maxima and eliminated. The content of the table SORT is then shifted so as to fill in the gaps, the numbers of occurrence corresponding being updated.

The concept of proximity is determined as previously, but with a different threshold, $S_5$ ($S_5$ being set at 2 for example). In the table SORT, represented in FIG. 7; SORT(k,1) is the X component of the vector ranked in line k and SORT(k,2) is the Y component of the same vector.

Let i and j be greater than k:

if |SORT(k,1)−SORT(i,1)| < $S_5$

|SORT(k,2))−SORT(i,2) < $S_5$ and if |SORT(k,1)−SORT(j,1) < $S_5$ $$|SORT(k,2) - SORT(j,2)| < S_5$$

then the vectors ranked in lines i and j are secondary maxima and are deleted from the table SORT.

These operations begin for k=1 then k is incremented until all the vectors of the table SORT are covered.

At the termination of this step the secondary maxima, around a maximum having a higher number of occurrences, are eliminated.

The next step is then a time filtering:

This time filtering is applied to the table SORT which contains $N_t$ vectors at the end of the preceding step. The aim of the preceding operations was to extract the dominant vectors from a high-definition image quarter in order to reduce the flow rate of the field of motion which will be encoded, subsequent to the processing, by an encoding method referred to as "quad-tree". The number of vectors transmitted is chosen as a function of the permitted flow rate and denoted Nmax per one image quarter.

The first Nmax vectors of the table SORT are transferred into a buffer memory MEM1 and compared with those which were extracted as dominant vectors for the preceding image and which are contained in a buffer memory MEM2 as illustrated by FIG. 8. If one vector of the table SORT from the Nmax transferred into the memory MEM1 is distant, in the sense of the distance defined earlier with a threshold $S_1$, from all the vectors of the memory MEM2, this vector is eliminated from SORT; the table SORT is next shifted in order to fill in the gap and retrieve an additional vector if $N_t$ is greater than Nmax. After having verified that the Nmax vectors of the table SORT are close to those of the table MEM2, these vectors are transmitted to the next module. The content of the table MEM1 is transferred into the table MEM2 in such a way as to consider the case where a new motion appears, for example when an object in a background common to the two images begins to move; the content of the table MEM2 is not modified by the result of the time filtering.

The next step is the phase of reassigning a vector to each block of pixels of dimensions n×n in the image.

The reassigning step consists, by using the vectors selected by the preceding phases, in seeking for each n×n image pixel block the vector best able to represent this block. In fact, one of the Nmax vectors (these vectors may possibly be fewer in number than Nmax) considered as dominant in the image, is allotted to each elementary block of n.n pixels. To this end, the field of vectors resulting from the first step (assigning of one vector per n×n block) is taken up again, and to each block is attributed the dominant vector closest to the vector initially assigned to this block:

Let $V(V_x, V_y)$ be the vector of the block under consideration, at the termination of the first step. The distance between this vector and each of the dominant vectors of the table SORT is calculated as follows:

$$D_1(k) = Max(D_x(k), D_y(k))$$

with $D_x(k) = |V_x - SORT(k,1)|$ $D_y(k) = |V_y - SORT(k,2)|$

The vector assigned to the block is the vector Vas($Vas_x, Vas_y$) of rank k in the table SORT which gives the minimum such as defined above distance $D_1(k)$.

However, if the minimum distance $D_1(k)$ is greater than the threshold $S_5$, no vector is assigned to this block.

Furthermore, in the case where several indices k give the same minimum D1, the motion vectors corresponding to these indices are decided upon by taking the one which gives a distance D2(k) such that:

$$D2(k) = lowest\ min(D_x(k), D_y(k)).$$

At the termination of this step there may exist blocks to which no dominant vector has been able to be assigned.

The next phase is the processing of the unassigned blocks. As indicated above, at the termination of the step of reassigning a vector to each n×n block, it may be found that none of the dominant vectors of the table SORT is suitable. These blocks may be blocks with erroneous initial motion by virtue of poor operation of the estimator of motion, or blocks with particular local motion corresponding for example to objects in motion of very small size.

For these blocks, the assigning of a vector is effected in terms of the "quad-tree" encoding. It is in this way that, if the three blocks neighbouring the block under consideration in the sense of the "quad-tree" partitioning have the same vector, this vector is allotted to the unassigned block. If the vectors of the three neighbouring blocks in the sense of the "quad-tree" encoding are not identical, the majority vector in the neighbourhood of the eight closest blocks is attributed to the unassigned block.

The next step is the filtering of the isolated blocks.

The field of the reassigned motion obtained at the end of the step of processing the unassigned blocks is filtered so as to eliminate the blocks with isolated vectors, since these blocks have a high cost in terms of encoding rate. A block is referred to as block with isolated vector if it is surrounded by 8 blocks having the same vector, the vector of the central block thus differing from all its neighbours. In this event the vector of the neighbouring blocks is allotted to the central block.

The next step carried out at the termination of this filtering is the calculation of the encoding rate.

In fact, before transmission it is necessary to verify that the cost of encoding the motion vectors resulting from the segmenting method thus carried out is compatible with the maximum permitted encoding rate. The information relating to the field of motion is encoded as indicated above, by a method of encoding referred to as "quad-tree", that is to say according to an encoding tree constructed by partitioning macroblocks of pixels according to 4 quadrants, then of each resulting quadrant into 4 etc. until the blocks resulting from the partitioning are homogeneous as regards the motion field of vectors. Such a method is described for example in an article entitled "Optimal Quadrature Construction Algorithm" by C. A. SHAFFER and H. SAMET in "Computer Vision Graphics, and Image Processing" vol. 37, 402–419 (1987).

The flow rate after encoding is calculated by considering the "macroblocks", of 128.128 pixels for example. If n×n is the size of the elementary block, n is always a power of 2, there are $log_2(128/n)$ levels of depth in the encoding tree of each macroblock in addition to the initial level corresponding to the macroblock itself. If "level 0" is the initial level, the first level, that is to say one of 64×64 blocks, is attained if the macroblock is not uniform. The second level is attained for a 64×64 block if it is not uniform and the process continues thus until the elementary block of dimension n×n.

The flow rate D, for a high-definition image quarter, is obtained through the following formula: $D = No \times b \times MB \times c$ (bits/s) where:
- "No" is the number of nodes of all the encoding trees,
- "b" is the number of bits necessary for the description of each possible state for a node;
- "MB" is the number of macroblocks for an image quarter;
- "c" is the number of fields per second.

The state of a node is either one of the dominant vectors representing the field of motion of the image, or an indicator for passing to the lower level of the tree which indicates a partitioning of the block into four.

Assuming that the number of vectors extracted by the preceding segmenting algorithm is Nt, that the number of vectors actually transmitted after time filtering is Ntrans, and that the maximum number of vectors transmitted is Nmax (Ntrans is always equal to or less than Nmax), the number of bits necessary for the description of the state of a node is the integer greater than or equal to $\log_2$ (Ntrans+1).

Figure 9:
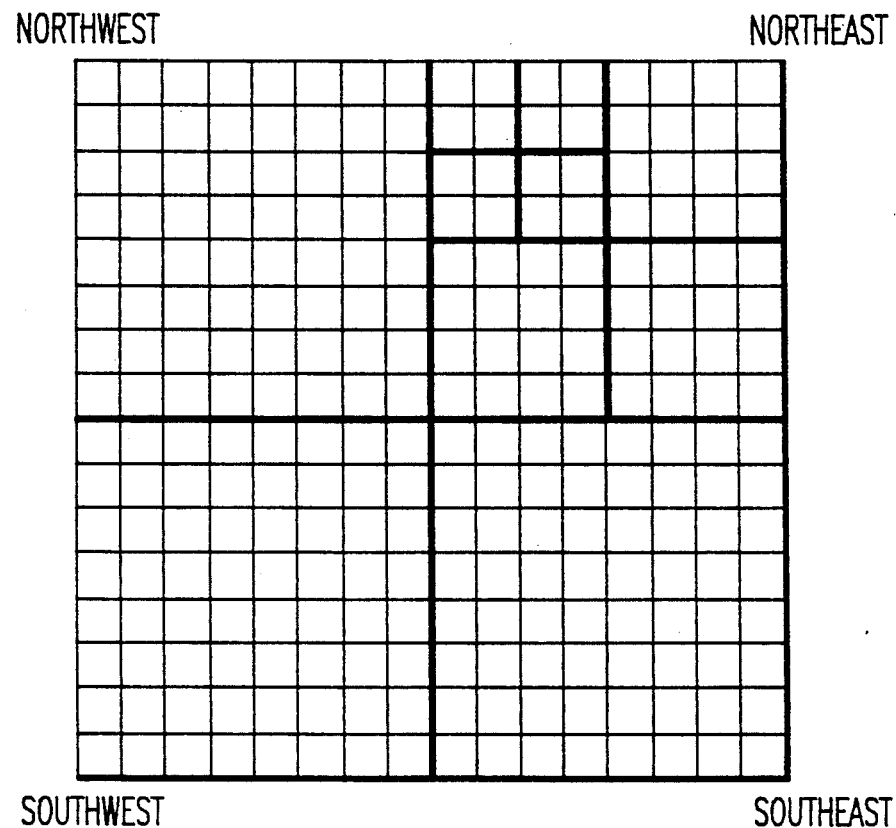
FIGS. 9 and 10 respectively illustrate the uniform vector zones in a macroblock of 16×16 elementary blocks and the corresponding encoding tree.
Figure 10:
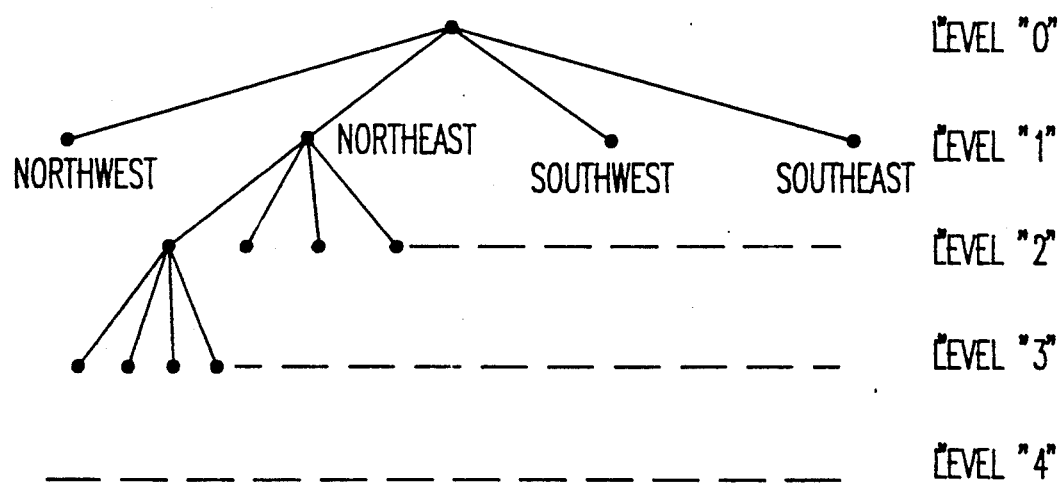

FIGS. 9 and 10 illustrate the partitioning and the encoding, for a macroblock of 16×16 elementary blocks with four levels 0, 1, 2 and 3. FIG. 9 illustrates the segmenting of the field of motion of the macroblock corresponding to the encoding tree represented in FIG. 10: the northwest quarter of the macroblock is uniform, like the southwest and southeast quarters which are therefore each encoded by a different vector at level 1; the northeast quarter comprises three uniform quarters each encoded by a vector at level 2, and one nonuniform quarter itself encoded after partitioning into four, at level 3; the blocks at level 3 being uniform. The encoding tree represented in FIG. 10 comprises 13 nodes; if Nmax=7 and Ntrans=Nmax, the number of bits necessary for the description of the state of a node is $E[\log_2 8]$, (E(X) is the representation of the operation which consists in taking the integer greater than or equal to X), i.e. 3; it is not necessary to descend to the last level. The cost of the tree of the macroblock such as is represented in the figure is equal to $13 \times E(\log_2(Nmax+1))$. If Nmax equals 7, that is to say if there exist 7 dominant vectors registered for this image quarter, the cost of the tree is $13 \times 3 = 39$ bits.

The macroblocks, the number of which is necessarily integer, cover a larger zone than the high-definition image quarter on which the segmenting is carried out. In fact, an HD image quarter comprises 90×72 elementary blocks of 8×8 pixels, i.e. a little less than 6 macroblocks horizontally and a little less than 5 blocks vertically. The portions of macroblocks which overspill the high-definition image quarter are filled by the vector which gives the minimal cost for the encoding tree.

The segmenting algorithm is executed on each image quarter separately; the flow rate calculated by the earlier formula therefore corresponds to only a fraction of the total flow rate.

The last step is a step of regulating the flow rate.

Insofar as the flow rate calculated at the termination of the preceding phase is greater than the permitted limit, the segmenting method is taken up again at the start of the phase of reassigning a vector to each n×n block, and before taking up this step again the number Nmax is diminished by one. The four last steps are then taken up again and so on until the total calculated flow rate is less than or equal to the maximum permitted flow rate.

It was indicated in the earlier description that the method of segmenting using a "pointwise" field of motion, that is to say comprising one motion vector for each of the pixels or possibly one motion vector for one pixel in two of each line, arranged in staggered formation in successive lines.

The method according to the invention likewise applies to block field of motion segmenting if the estimator of motion used upstream furnishes a block motion vector. Of course in this event, the step of assigning one vector per n×n block is deleted if the estimator furnishes one motion vector per n×n block or modified if the estimator furnishes one motion vector for a block of size smaller than n×n.

Figure 11:
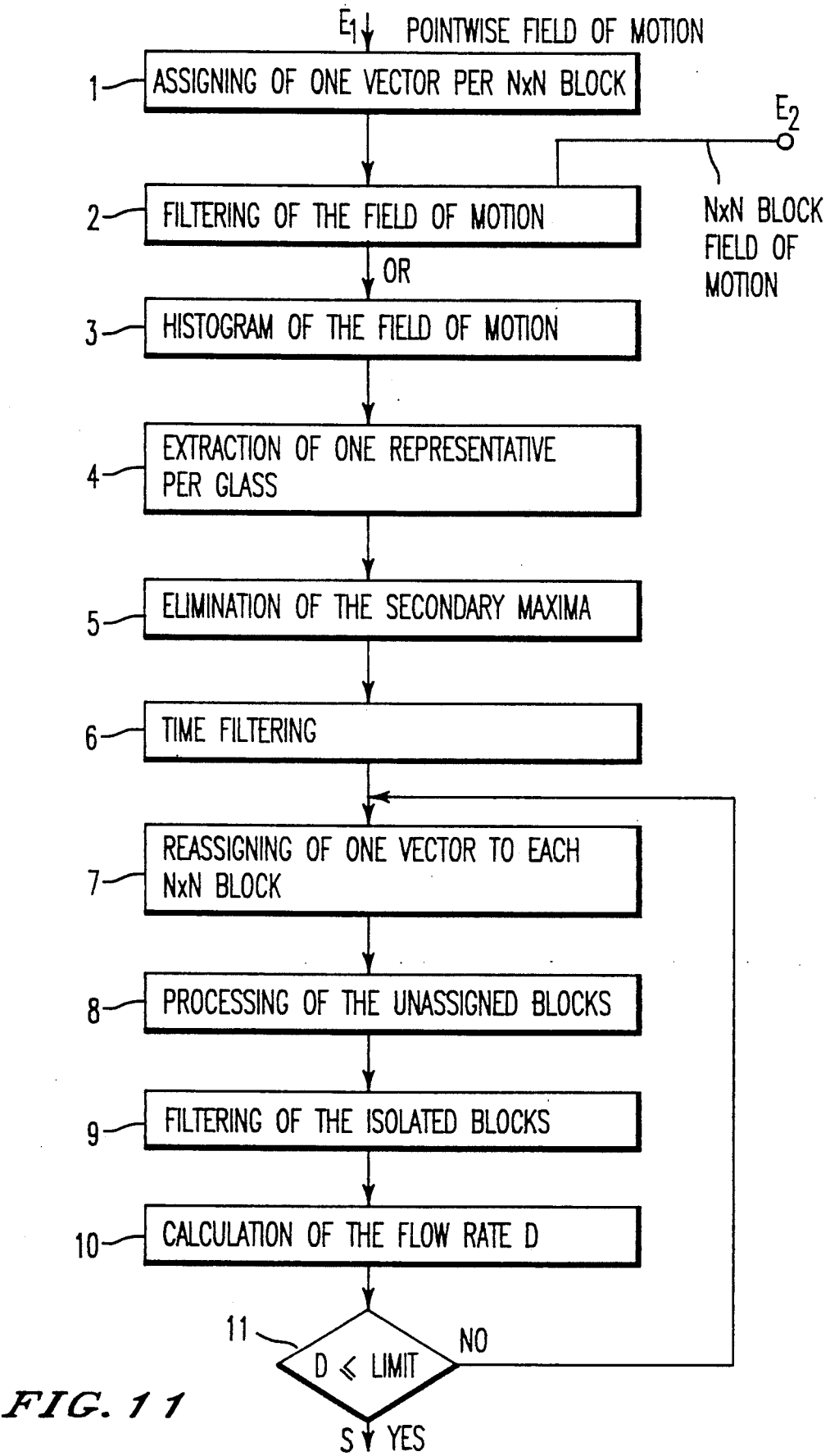
FIG. 11 is the flow diagram of the method of segmenting a pointwise field of motion in accordance with the invention.

FIG. 11 illustrates the succession of the various steps, such as they have been described precisely above, of the method of segmenting a pointwise field of motion, namely:
- the assigning of one vector per n×n block from a field of pointwise vectors of motion which is applied to the input $E_1$;
- the filtering of the blockwise field of motion resulting from the first phase (or possibly available directly if there is available an n.n pixel blockwise motion vector field which is then applied to the input $E_2$);
- the formation of the histogram of the filtered field of motion for an image quarter;
- the extraction of a representative vector per class of motion;
- the elimination of the secondary maxima;
- the time filtering;
- the reassigning of a vector to each n.n block;
- the processing of the blocks to which no vector was able to be assigned;
- the filtering of the isolated blocks;
- the calculation of the encoding rate, and the verification that this rate is less than a limit value, in default of which a new reassigning step is carried out as indicated above, if the rate is suitable the encoding of the segmented motion vector field thus obtained at the output S can then be carried out with a view to transmission.

The invention is not limited to the method such as described in detail above. In particular, a certain number of choices have been made at each step of the segmenting method and a certain number of calculations are carried out at each step. The precise figures given by way of example in relation to the dimensions of the blocks and in relation to the threshold values are not limiting. As regards the threshold values it is however necessary that $S_2$ be greater than $S_1$ and that $S_5$ be greater than $S_2$.

Moreover, the image-quarter processing, particularly adapted to the quad-tree encoding provided next, is not an essential element of the invention. Insofar as the calculating capacities would be sufficient for the once-only processing of the image, it would be possible to effect the same processing on the whole of the image, or equally to carry out the processing on portions of images which are not ¼.

The phase of filtering the n×n block field of motion (2nd phase of the segmenting method) facilitates the subsequent processing but is not essential, in particular by virtue of the fact that a phase of filtering the isolated blocks is provided next and that, as a whole, the segmenting method according to the invention aims to not include isolated vectors of motion. The filtering of the field of motion and/or the filtering of the isolated blocks, mentioned in the 2nd and 9th phases of the segmenting method, could therefore be modified or even deleted depending upon the type of sequence analysis carried out.

In the step of forming the histogram, which next enables formation of the table of most often encountered vectors of motion, it has been indicated above that not only was the location corresponding to the vector accepted for the current block after filtering incremented, but also the eight vectors of its neighbourhood. This feature provided in order to spread the histogram could prove to be unnecessary in certain cases, for example if the image is processed once only. The multiplication by 8 of the components $V_z$ and $V_y$ is likewise a convenience, and not indispensable.

Other modifications could be provided without exceeding the scope of the invention. For example in certain cases it could be sufficient to select the N vectors of the histogram table having the highest numbers of occurrences without implementing the phase referred to as extraction of one representative vector per "class of motion" and to directly use these vectors as dominant vectors in order to reassign a vector to each block before encoding.

I claim:

1. Method of segmenting the field of motion arising from an estimator of motion delivering, in the form of vectors with two components in the image plane, the displacement of pixels of an image relative to the preceding image, characterized in that it comprises:
   a preliminary step of partitioning the image into blocks of n by n pixels and of assigning of a vector of motion chosen for each block from the possible vectors according to a majority criterion;
   a step of setting-up of a histogram of the blockwise motion vectors at the termination of which a classifying of the motion vectors encountered is carried out according to their number of occurrences;
   a step of reassigning of a motion vector for each of the blocks, the, reassigned vector being chosen from a limited number N of dominant vectors selected from the histogram, and being the vector, from these dominant vectors, closest to the initial vector of the block;
   a step of determining isolated blocks which have motion vectors incoherent with those of the blocks of their neighbourhood and filtering the vectors of the isolated blocks having motion vectors incoherent with those of the blocks of their neighbourhood;
   a step of calculating the flow rate necessary for the encoding of the resulting, filtered field of motion, and of verifying that this flow rate is less than or equal to a maximum possible flow rate, the step of reassigning of a motion vector for each of the blocks from a lower number or dominant vectors being taken up again when the flow is greater than the maximum possible flow rate.

2. Method according to claim 1, characterized in that, for the processing of a pointwise field of motion, the preliminary phase consists in seeking, for each block of n×n pixels, the motion vector whose number of occurrences is greatest in the block, and in the event of equality, the one which has the lowest dispersion.

3. Method according to claim 1, characterised in that, for the block-processing of a field of motion, the preliminary phase consists in transmitting the field of motion if the block has a dimension n×n and in transmitting a vector assigned to the n×n block if the field of motion is established on blocks of lower dimension.

4. Method according to one of claims 1 to 3, characterised in that a step of block-filtering of the field of motion is carried out before the step of forming the histogram, this filtering consisting in replacing the motion vector of the block by that of one of its 8 neighbours when the vector of the block is estimated distant from those of its 8 neighbours.

5. Method according to one of claims 1 to 3, characterised in that the forming of the histogram of the blockwise field of motion vectors is carried out from a two-dimensional table, the central location of which corresponds to a zero displacement, and the other locations of which correspond to all the possible displacements, the locations of a same line (respectively column) of the table corresponding to an abscissa (respectively ordinate) component of displacement in the current image, the histogram being formed by increasing by 1 the content of the location corresponding to the displacement of the current analysed block as well as the 8 neighbouring locations of the histogram table.

6. Method according to claim 5, characterised in that, for the reassigning phase, the dominant vectors are the N vectors having the largest numbers of occurrence in the histogram table.

7. Method according to claim 5, characterised in that the reassigning phase is preceded by a phase for extracting one representative vector per class of motion consisting in classing the vectors by decreasing order of the contents of the corresponding locations of the histogram table, then in eliminating the vectors close to a vector of higher rank, to form a sequence, to within a threshold $S_2$, of vectors representing widened classes of motion.

8. Method according to claim 7, characterised in that, among the vectors representing widened classes of motion, those which correspond to secondary maxima defined by pairs of two different vectors close to a vector of higher rank, proximity being accepted by comparison with a threshold $S_5$ greater than $S_2$, are likewise eliminated, the set of vectors remaining after this elimination of the close vectors being the dominant vector set used for the encoding of the block field of motion.

9. Method according to claim 8, characterised in that, before the reassigning step a time filtering of the set of dominant vectors is carried out, by comparing each vector with all the vectors of the set of dominant vectors which was established for the preceding image and eliminating vectors which are estimated distant from all the vectors of the set associated with the preceding image.

10. Method according to claim 1, characterised in that the reassigning step comprising seeking, in the set of dominant vectors, the vector closest to the initial vector of the block by calculating a distance between the initial vector and each of the dominant vectors and selecting the dominant vector leading to the minimum distance.

11. Method according to claim 10, characterised in that the dominant vector leading to the minimum distance is reassigned to the block only if this distance is less than a threshold, the blocks to which no vector has been able to be assigned being allocated during the encoding of a motion vector dependent on the vectors of the neighbouring blocks.

12. Application of the method of segmenting the field of motion of video images according to one of claims 1, 2, 3, 10 and 11 to the encoding of images according to a method of "quad-tree" type.

* * * * *